(12) United States Patent
Kotzur et al.

(10) Patent No.: US 11,093,180 B2
(45) Date of Patent: Aug. 17, 2021

(54) RAID STORAGE MULTI-OPERATION COMMAND SYSTEM

(71) Applicant: Dell Products L.P., Round Rock, TX (US)

(72) Inventors: Gary Benedict Kotzur, Austin, TX (US); William Emmett Lynn, Round Rock, TX (US); Kevin Thomas Marks, Georgetown, TX (US); Chandrashekar Nelogal, Round Rock, TX (US); James Peter Giannoules, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/585,296

(22) Filed: Sep. 27, 2019

(65) Prior Publication Data

US 2021/0096779 A1  Apr. 1, 2021

(51) Int. Cl.
*G06F 3/06* (2006.01)
*G06F 9/30* (2018.01)

(52) U.S. Cl.
CPC .......... *G06F 3/0689* (2013.01); *G06F 3/0604* (2013.01); *G06F 3/0611* (2013.01); *G06F 3/0659* (2013.01); *G06F 9/30029* (2013.01)

(58) Field of Classification Search
CPC .. G06F 3/0689; G06F 9/30029; G06F 3/0659; G06F 3/0611; G06F 3/0604
See application file for complete search history.

(56) References Cited

U.S. PATENT DOCUMENTS

| | | | |
|---|---|---|---|
| 6,105,075 A * | 8/2000 | Ghaffari | G06F 9/3879 710/22 |
| 8,250,283 B1 | 8/2012 | Lee et al. | |
| 9,823,968 B1 * | 11/2017 | Fugini | G06F 11/1076 |
| 9,858,146 B2 * | 1/2018 | Moertl | G06F 3/0619 |

(Continued)

OTHER PUBLICATIONS

Luse, Paul, RAID Revisited: A technical look at RAID 5, INFOSTOR, 2001, 4pps., vol. 5, Issue 7., http://www.infostor.com/index/articles/display/107505/articles/infoster/volume-5/issue-7/features/special-report/raid-revisted-a-technical-look-at-raid-5.html.

*Primary Examiner* — David Yi
*Assistant Examiner* — Trung-Hao Joseph Nguyen
(74) *Attorney, Agent, or Firm* — Haynes and Boone, LLP

(57) ABSTRACT

A RAID storage multi-operation command system includes a RAID storage controller device that generates a multi-operation command including a multi-operation command role and a plurality of addresses, and transmits the multi-operation command, and also includes a RAID storage device that is coupled to the RAID storage controller device. The RAID storage device receives the multi-operation command from the RAID storage controller device, and identifies a plurality of operations that are associated in a database with the multi-operation command role included in the multi-operation command. The RAID storage device then performs the plurality of operations using the plurality of addresses included in the multi-operation command, which may include retrieving first data located in a first address, retrieving second data located in a second address, performing an XOR operation on the first and second data to produce third data, and writing the third data to one or more third addresses.

20 Claims, 9 Drawing Sheets

(56) References Cited

U.S. PATENT DOCUMENTS

2003/0033477 A1* 2/2003 Johnson ................ G06F 3/0601
    711/114
2015/0046605 A1* 2/2015 Barrell ................ G06F 3/0659
    710/5

* cited by examiner

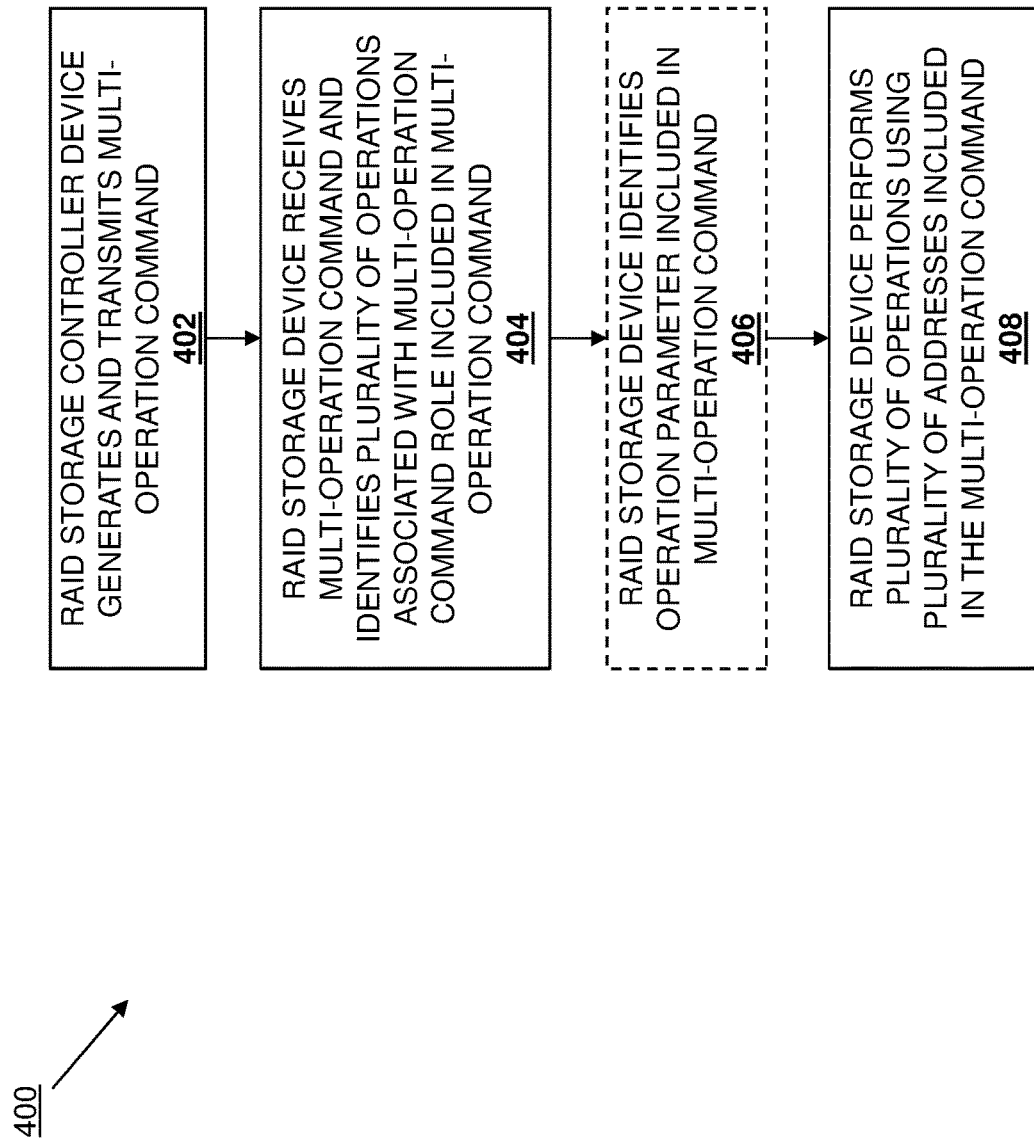

| ROLE | ADDR. 1 | ADDR. 2 | ADDR. 3 | LENGTH | PARA. | STEPS |
|---|---|---|---|---|---|---|
| WRITE WITH BUFFER | PHY. MEMORY (SOURCE) | LOG. MEMORY (DESTINATION) | PHY. MEMORY (DESTINATION) | # LBA | N/A | ADDR. 1 > ADDR. 2; ADDR. 1 > ADDR. 3 |
| WRITE WITH XOR | PHY. MEMORY (SOURCE) | LOG. MEMORY (SOURCE/DEST) | PHY. MEMORY (DESTINATION) | # LBA | COUNT (OPTIONAL) | XOR(ADDR. 1, ADDR. 2) > ADDR. 3; ADDR. 1 > ADDR. 2 [OPTIONAL > REPEAT PER COUNT] |
| GENERATE Q | PHY. MEMORY (SOURCE) | PHY. MEMORY (SOURCE) | LOG. MEMORY (DESTINATION) | # LBA | MULTIPLICAND & POSITION | GF(PARA., (ADDR. 1, ADDR. 2)) > ADDR. 3 |
| DATA MANIPULATION | PHY. MEMORY (SOURCE) | PHY. MEMORY (SOURCE) | PHY. MEMORY (DESTINATION) | # LBA | OPERATOR | ADDR. 1 (OPERATOR) ADDR. 2 > ADDR. 3 |

| ROLE | ADDR. 1 | ADDR. 2 | ADDR. 3 | LENGTH | PARA. | STEPS |
|---|---|---|---|---|---|---|
| WRITE | PHY. MEMORY (SOURCE) | LOG. MEMORY (DESTINATION) | N/A | # LBA | N/A | ADDR. 1 > ADDR. 2; |
| RAID 1 WRITE | PHY. MEMORY (SOURCE) | LOG. MEMORY (DESTINATION) | PHY. MEMORY (DESTINATION) | # LBA | N/A | ADDR. 1 > ADDR. 2 ADDR. 1 > ADDR. 3 |
| RAID 5 PARITY WRITE | PHY. MEMORY (SOURCE) | PHY. MEMORY (SOURCE) | LOG. MEMORY (DESTINATION) | # LBA | N/A | XOR(ADDR. 1, ADDR. 2) > ADDR. 3 |
| RAID 5 PARITY PARTIAL WRITE 1 | PHY. MEMORY (SOURCE) | LOG. MEMORY (SOURCE/DEST) | N/A | # LBA | N/A | XOR(ADDR. 1, ADDR. 2) > ADDR. 2 |
| RAID 5 PARITY PARTIAL WRITE 2 | PHY. MEMORY (SOURCE) | LOG. MEMORY (SOURCE/DEST) | PHY. MEMORY (DESTINATION) | # LBA | N/A | XOR(XOR(ADDR. 1, ADDR. 2), ADDR. 3 > ADDR. 2 |
| RAID 5 COMPUTE | PHY. MEMORY (SOURCE) | PHY. MEMORY (SOURCE) | PHY. MEMORY (DESTINATION) | # LBA | N/A | XOR(ADDR. 1, ADDR. 2) > ADDR. 3 |
| RAID 5 RECOVERY INTERIM | PHY. MEMORY (SOURCE) | LOG. MEMORY (DESTINATION) | PHY. MEMORY (DESTINATION) | # LBA | N/A | XOR(ADDR. 1, ADDR. 2) > ADDR. 3 |
| RAID 5 DATA PARTIAL WRITE | PHY. MEMORY (SOURCE) | LOG. MEMORY (SOURCE/DEST) | PHY. MEMORY (DESTINATION) | # LBA | N/A | XOR(ADDR. 1, ADDR. 2) > ADDR. 2 ADDR. 2 > ADDR. 3 |

FIG. 7A

| ROLE | ADDR. 1 | ADDR. 2 | ADDR. 3 | LENGTH | PARA. | STEPS |
|---|---|---|---|---|---|---|
| RAID 6 UPDATE | PHY. MEMORY (SOURCE) | LOG. MEMORY (SOURCE) | PHY. MEMORY (DESTINATION) | # LBA | N/A | GF MULTIPLY(ADDR. 1, ADDR. 2) > ADDR. 3 |
| RAID 6 COMPUTE 1 | PHY. MEMORY (SOURCE) | PHY. MEMORY (SOURCE) | PHY. MEMORY (DESTINATION) | # LBA | N/A | GF MULTIPLY(ADDR. 1, ADDR. 2) > ADDR. 3 |
| RAID 6 COMPUTE 2 | PHY. MEMORY (SOURCE) | N/A | PHY. MEMORY (DESTINATION) | # LBA | $G^Y$ INDEX, EXP | GF MULTIPLY(GFLOG$_Y$, ADDR. 1) > ADDR. 3 |
| RAID 6 RECOVERY 1 | PHY. MEMORY (SOURCE) | N/A | PHY. MEMORY (DESTINATION) | # LBA | $G^X$, $G^Y$ INDEX, EXP | GF INVERSE MULTIPLY(XOR(GFILOG$_X$, GFILOG$_Y$), ADDR. 1) > ADDR. 3 |
| RAID 6 RECOVERY 2 | PHY. MEMORY (SOURCE) | LOG. MEMORY (DESTINATION) | N/A | # LBA | $G^X$, $G^Y$ INDEX, EXP | GF INVERSE MULTIPLY(XOR(GFILOG$_X$, GFILOG$_Y$), ADDR. 1) > ADDR. 2 |
| RAID 6 TABLES GENERATION | N/A | N/A | N/A | N/A | POLY, N | |

FIG. 7B

| ROLE | ADDR. 1 | ADDR. 2 | ADDR. 3 | LENGTH | PARA. | STEPS |
|---|---|---|---|---|---|---|
| READ | PHY. MEMORY (DESTINATION) | LOG. MEMORY (SOURCE) | N/A | #LBA | N/A | ADDR. 2 > ADDR. 1 |
| COPY | PHY. MEMORY (DESTINATION) | N/A | PHY. MEMORY (SOURCE) | #LBA | N/A | ADDR. 3 > ADDR. 1 |
| ACQUIRE LOCK | N/A | LOG. MEMORY (DESTINATION) | N/A | #LBA | N/A | |
| RELEASE LOCK | N/A | LOG. MEMORY (DESTINATION) | N/A | #LBA | N/A | |
| ACQUIRE LOCK AND READ | PHY. MEMORY (SOURCE) | LOG. MEMORY (DESTINATION) | N/A | #LBA | N/A | ADDR. 2 > ADDR. 1 |

RAID STORAGE MULTI-OPERATION COMMAND SYSTEM

BACKGROUND

The present disclosure relates generally to information handling systems, and more particularly to multi-operation commands for Redundant Array of Independent Disk (RAID) storage devices in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems sometime utilize storage systems such as those provided by a Redundant Array of Independent Disks (RAID) storage system that includes a plurality of RAID storage devices. As will be appreciated by one of skill in the art, RAID storage systems are provided by a data storage virtualization technology that combines the physical RAID storage devices into one or more logical storage units for the purposes of data redundancy, performance improvements, and/or other benefits known in the art. For example, data in a RAID storage system may be distributed across the RAID storage devices using several different techniques that are referred to as "RAID levels" that depend on a desired level of redundancy and performance (e.g., RAID 0, RAID 1, RAID 5, RAID 6, and so on), with each RAID level providing a different balance among goals that include reliability, availability, performance, and capacity. However, the introduction of new storage technologies for use in RAID storage systems has been found to raise some issues.

For example, Non-Volatile Memory express (NVMe) storage devices (e.g., NVMe Solid State Drive (SSD) storage devices) utilize an open logical device interface specification for accessing its non-volatile storage media (e.g., provided by NAND flash memory devices) via a Peripheral Component Interconnect express (PCIe) bus to provide low latency, internal parallelism, and/or other benefits known in the art. However, NVMe storage devices present a challenge when utilized with RAID storage systems because the aggregate performance of the NVMe storage devices is typically much greater than the performance capabilities of the RAID storage controller provided for the RAID storage system (and is even projected to be much greater than the performance capabilities of next-generation RAID storage controllers), which results in those RAID storage controllers unable to manage more than a few NVMe storage devices (e.g., conventional RAID storage controllers are capable of managing approximately four NVMe storage devices). As such, the use of NVMe storage devices in RAID storage subsystems present RAID storage system scaling issues, as the RAID storage controllers cannot scale with more than a few NVMe storage devices.

Accordingly, it would be desirable to provide a RAID storage system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a RAID storage engine that is configured to: receive, from a RAID storage controller device, a multi-operation command that includes: a multi-operation command role; and a plurality of addresses; identify, in a database, a plurality of operations that are associated with the multi-operation command role included in the multi-operation command; perform the plurality of operations using the plurality of addresses included in the multi-operation command.

BRIEF DESCRIPTION OF THE DRAWINGS

FIG. 4 is a flow chart illustrating an embodiment of a method for executing multi-operation commands by RAID storage devices.

FIG. 5 is a schematic view illustrating an embodiment of a multi-operation command table.

FIG. 7A is a table view illustrating a multi-operation command table that include multi-operation commands that may be implemented in the RAID storage system of FIG. 2 operating during the method of FIG. 4.

FIG. 7B is a table view illustrating a multi-operation command table that include multi-operation commands that may be implemented in the RAID storage system of FIG. 2 operating during the method of FIG. 4.

FIG. 7C is a table view illustrating a multi-operation command table that include multi-operation commands that may be implemented in the RAID storage system of FIG. 2 operating during the method of FIG. 4.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, read-only memory (ROM), and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
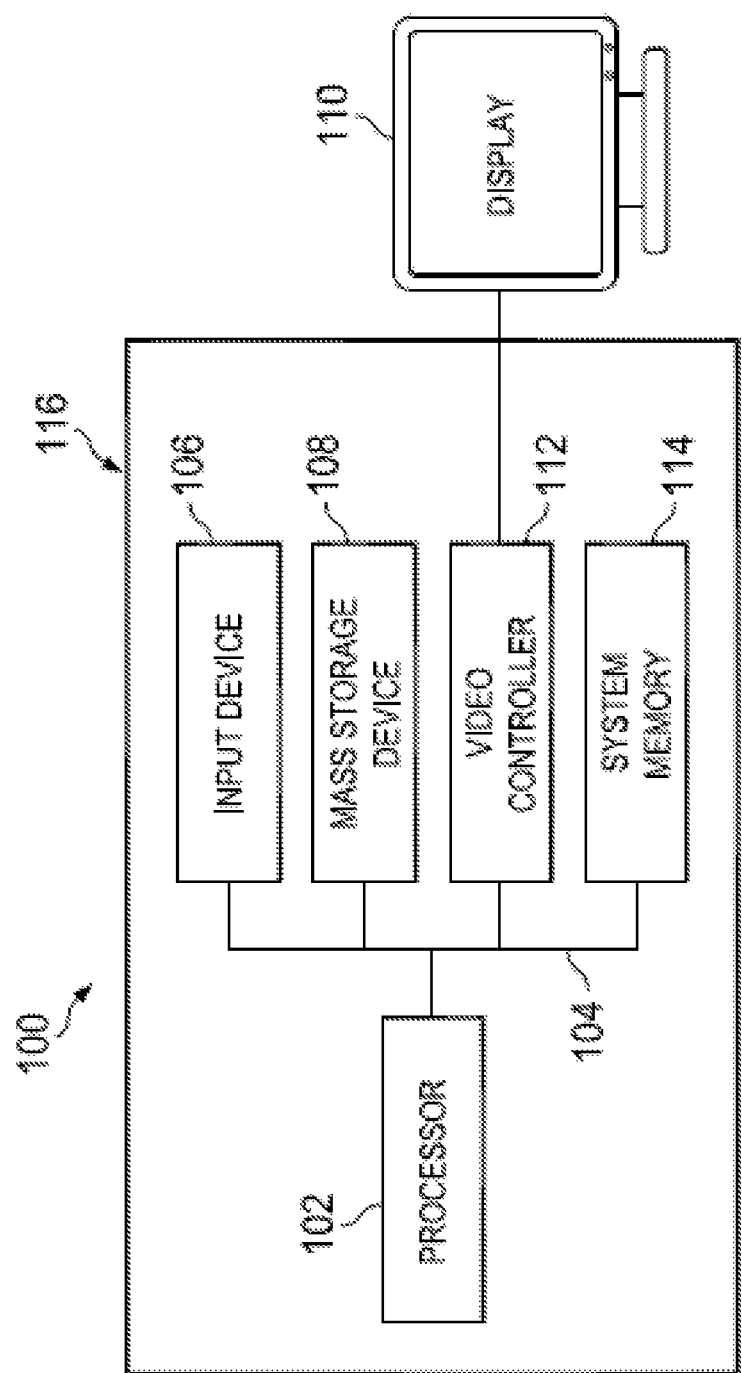
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
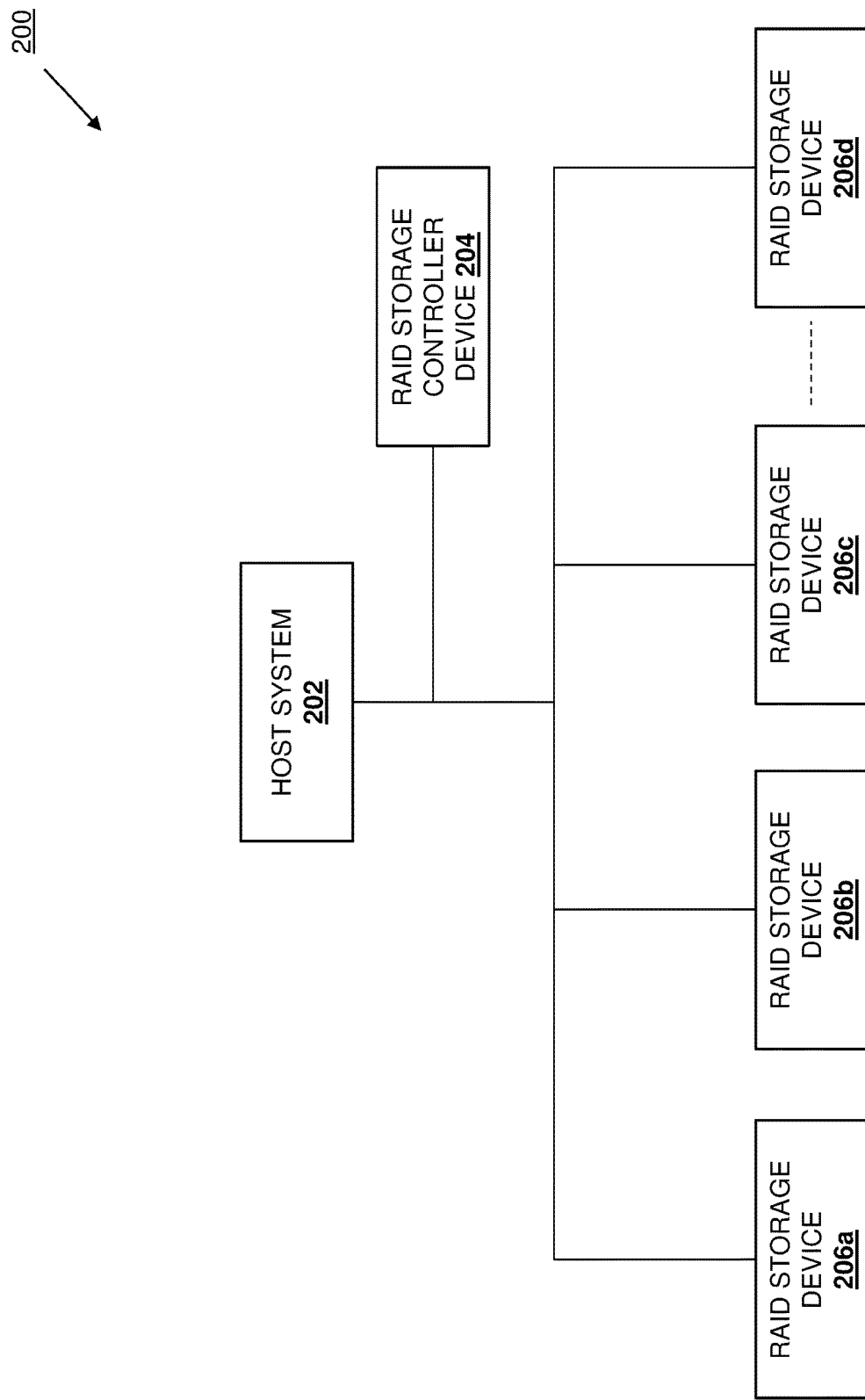
FIG. 2 is a schematic view illustrating an embodiment of a RAID storage system.

Referring now to FIG. 2, an embodiment of a Redundant Array of Independent Disks (RAID) storage system 200 is illustrated. In the illustrated embodiment, the RAID storage system 200 includes a host system 202. In an embodiment, the host system 202 may be provided by the IHS 100 discussed above with reference to FIG. 1, and/or may include some or all of the components of the IHS 100. For example, the host system 202 may include server device(s), desktop computing device(s), a laptop/notebook computing device(s), tablet computing device(s), mobile phone(s), and/ or any other host devices that one of skill in the art in possession of the present disclosure would recognize as operating similarly to the host system 202 discussed below. In the illustrated embodiment, the RAID storage system 200 also includes a RAID storage controller system 204 that is coupled to the host system 202 and that may be provided by the IHS 100 discussed above with reference to FIG. 1, and/or may include some or all of the components of the IHS 100. For example, the RAID controller system 204 may include any storage device/disk array controller device that is configured to manage physical storage devices and present them to host systems as logical units.

Furthermore, in the illustrated embodiment, the RAID storage system 200 also includes a plurality of RAID storage devices 206a, 206b, 206c, and up to 206d, each of which is coupled to the host system 202 and the RAID storage controller system 204. While a few RAID storage devices 206a-206d are illustrated, one of skill in the art in possession of the present disclosure will recognize that many more storage devices may (and typically will) be coupled to the RAID storage controller system 204 (e.g., in a datacenter) while remaining within the scope of the present disclosure. In the embodiments discussed below, the RAID storage devices 206a-206d are described as being provided by Non-Volatile Memory express (NVMe) Solid State Drive (SSD) drives, but one of skill in the art in possession of the present disclosure will recognize that other types of storage devices with similar functionality as the NVMe SSD drives (e.g., NVMe PCIe add-in cards, NVMe M.2 cards, etc.) may be implemented according to the teachings of the present disclosure and thus will fall within its scope as well. While a specific RAID storage system 200 has been illustrated and described, one of skill in the art in possession of the present disclosure will recognize that the RAID storage system of the present disclosure may include a variety of components and component configurations while remaining within the scope of the present disclosure as well.

Figure 3:
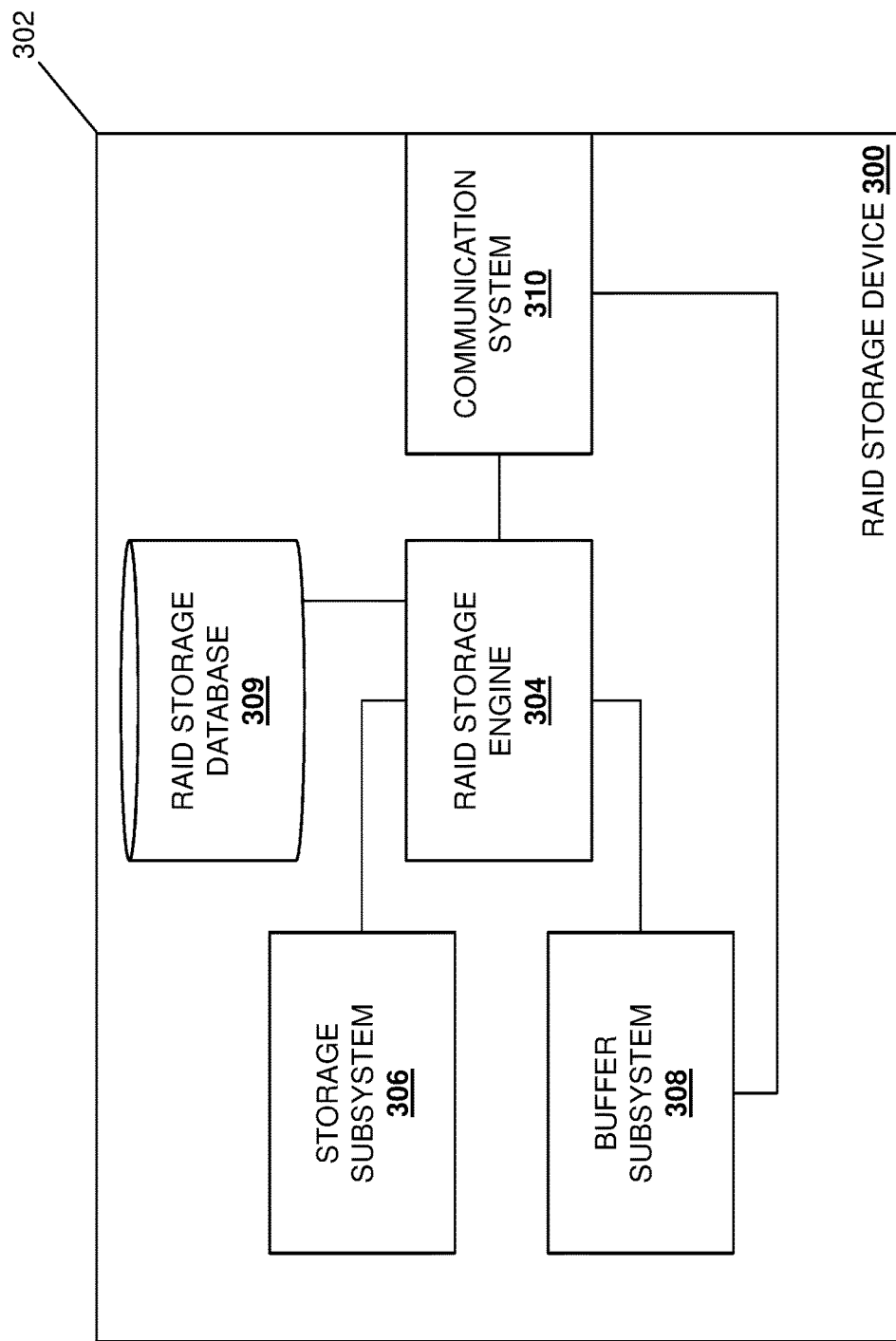
FIG. 3 is a schematic view illustrating an embodiment of a RAID storage device provided in the RAID storage system of FIG. 2.

Referring now to FIG. 3, an embodiment of a RAID storage device 300 is illustrated that may provide any or all of the RAID storage devices 206a-206d discussed above with reference to FIG. 2. As such, the RAID storage device 300 may be provided by an NVMe SSD storage devices, but one of skill in the art in possession of the present disclosure will recognize that other types of storage devices with similar functionality as the NVMe SSDs (e.g., NVMe PCIe add-in cards, NVMe M.2 cards, etc.) may be implemented according to the teachings of the present disclosure and thus will fall within its scope as well. In the illustrated embodiment, the RAID storage device 300 includes a chassis 302 that houses the components of the RAID storage device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a RAID storage engine 304 that is configured to perform the functionality of the RAID storage engines and/or RAID storage devices discussed below. While not illustrated, one of skill in the art in possession of the present disclosure will recognize that the RAID storage engine 304 may include, or be coupled to, other components such as queues (e.g., the submission queues and completion queues discussed below) and/or RAID storage device components that would be apparent to one of skill in the art in possession of the present disclosure.

The chassis 302 may also house a storage subsystem 306 that is coupled to the RAID storage engine 304 (e.g., via a coupling between the storage subsystem 306 and the processing system). Continuing with the example provided above in which the RAID storage device 300 is an NVMe SSD storage device, the storage subsystem 306 may be provided by a flash memory array such as, for example, a plurality of NAND flash memory devices. However, one of skill in the art in possession of the present disclosure will recognize that the storage subsystem 306 may be provided using other storage technologies while remaining within the scope of the present disclosure as well. The chassis 302 may also house a buffer subsystem 308 that is coupled to the RAID storage engine 304 (e.g., via a coupling between the buffer subsystem 308 and the processing system). Continuing with the example provided above in which the RAID storage device 300 is an NVMe SSD storage device, the buffer subsystem 308 may be provided by a Controller Memory Buffer (CMB). However, one of skill in the art in possession of the present disclosure will recognize that the buffer subsystem 308 may be provided using other buffer technologies while remaining within the scope of the present disclosure as well. The chassis 302 may also house a storage system (not illustrated, but which may be provided by the storage device 108 discussed above with reference to FIG. 1) that is coupled to the RAID storage engine 304 (e.g., via a coupling between the storage system and the processing system) and that includes a RAID storage database 309 that is configured to storage any of the information utilized by the RAID storage engine 304 as discussed below.

The chassis 302 may also house a communication system 310 that is coupled to the RAID storage engine 304 (e.g., via a coupling between the communication system 310 and the processing system) and the buffer subsystem 308, and that may be provided by any of a variety of storage device communication technologies and/or any other communication components that would be apparent to one of skill in the art in possession of the present disclosure. Continuing with the example provided above in which the RAID storage device 300 is an NVMe SSD storage device, the communication system 310 may include any NVMe SSD storage device communication components that enable the Direct Memory Access (DMA) operations described below, as well as any other NVMe SDD storage device communication functionality that would be apparent to one of skill in the art in possession of the present disclosure. While a specific RAID storage device 300 has been illustrated, one of skill in the art in possession of the present disclosure will recognize that RAID storage devices (or other devices operating according to the teachings of the present disclosure in a manner similar to that described below for the RAID storage device 300) may include a variety of components and/or component configurations for providing conventional RAID storage device functionality, as well as the functionality discussed below, while remaining within the scope of the present disclosure as well.

Referring now to FIG. 4, an embodiment of a method 400 for executing multi-operation commands by RAID storage devices is illustrated. As discussed below, the systems and methods of the present disclosure provide for the generation and transmission of multi-operation commands by a RAID storage controller device to a RAID storage device, with the RAID storage device that receives that multi-operation command configured to perform multiple operations identified using that multi-operation command using a plurality of addresses identified in the multi-operation command. For example, the multi-operation command may identify a multi-operation command role and the plurality of addresses, and the RAID storage device receiving that multi-operation command may identify a plurality of operations associated the multi-operation command role in a database. The RAID storage device may then perform the plurality of operations using the plurality of addresses. In a specific example, the performance of the operations using the plurality of addresses may include retrieving first data located in a first address in the plurality of addresses, retrieving second data located in a second address in the plurality of addresses, performing an XOR operation on the first data and the second data to produce third data, and writing the third data to one or more third addresses in the plurality of addresses. However, as discussed below, a variety other operations may be performed, and in some embodiments, may include the use of an operational parameter included in the multi-operation command. As such, RAID storage controller devices may send a single command that is configured to cause a RAID storage device to perform multiple operations, rather than sending a respective command for each of those operations, thus increasing the ability of the RAID storage controller device to scale with high performance RAID storage devices.

The method 400 begins at block 402 where a RAID storage controller device generates and transmits a multi-operation command. In an embodiment, at block 402, the RAID storage controller device 204 may receive an instruction from the host system 202 and, in response, may generate and transmit a multi-operation command to any of the RAID storage devices 206a-206d based on that instruction. With reference to FIG. 5, a multi-operation command table 500 illustrates a few specific examples of multi-operation commands that are discussed in further detail below. However, as discussed below, a variety of other multi-operation commands may be provided according to the teachings of the present disclosure while remaining within its scope as well. In the illustrated embodiment, the multi-operation command table 500 includes a multi-operation command role column that, as discussed in further detail below, may identify a multi-operation command role that is utilized by a RAID storage device to identify operational steps included in the multi-operation command associated with that multi-operation command role. The multi-operation command table 500 also includes a plurality of addresses columns such as the first address column (e.g., "ADDR. 1"), the second address column (e.g., ADDR. 2), and the third address column (e.g., "ADDR. 3") in the illustrated embodiment, each of which identifies an address that may be utilized to perform operations in a multi-operation command. The multi-operation command table 500 also includes a length column and a parameter column (e.g., "PARA.") that may identify a length and a parameter that may be utilized to perform operations in a multi-operation command. The multi-operation command table 500 also includes a steps column that identifies the operational steps performed for a multi-operation command. One of skill in the art in possession of the present disclosure will recognize that the multi-operation command table 500 is provided to allow a discussion of the multi-operation commands of the present disclosure, and that multi-operation commands may differ from those illustrated and described below in the multi-operation command table 500 while remaining within the scope of the present disclosure as well.

As such, in one specific example of block 402, the RAID storage controller device 204 may receive an instruction from the host system 202 that requires the writing of data from the host system 202 to both the storage subsystem 306 and the buffer subsystem 308 in the RAID storage device 206b and, in response, may determine that a multi-operation command with a "WRITE WITH BUFFER" multi-operation command role is required based on that instruction. As such, with reference to the multi-operation command table 500, the RAID storage controller device 204 may generate a multi-operation command that includes a WRITE WITH BUFFER multi-operation command role. Furthermore, that multi-operation command may identify a physical memory source address that is included in the host system 202 (e.g., "PHY. MEMORY (SOURCE)") and that identifies a physical memory location on the host system 202 that includes data that is to-be written to the RAID storage device 206b, a logical memory destination address that is included in the RAID storage device 206b (e.g., "LOG. MEMORY (DESTINATION)") and that identifies a logical memory location in the storage subsystem 306 on the RAID storage device 206 to which the data from the host system 202 will be written, and a physical memory destination address that is included in the RAID storage device 202b (e.g., "PHY. MEMORY (DESTINATION)" and that identifies a physical memory location in the buffer subsystem 308 (e.g., a CMB) on the RAID storage device 206b to which the data from the host system 202 will be written as well. Furthermore, that multi-operation command may include a length (e.g., "#LBA") that identifies how many blocks/Logical Block Addresses (LBAs) of data are being transferred as part of the multi-operation command. As can be seen in the multi-operation command table 500, the illustrated embodiment of the multi-operation command associated with the WRITE WITH BUFFER multi-operation command role does not include a parameter value.

In another specific example of block 402, the RAID storage controller device 204 may receive an instruction from the host system 202 that requires the writing of data from the host system 202 to the RAID storage device 206b, along with the performance of an XOR operation using the data from the host system 202 and data on the RAID storage device 206b and, in response, may determine that a multi-operation command with a "WRITE WITH XOR" multi-operation command role is required based on that instruction. As such, with reference to the multi-operation command table 500, the RAID storage controller device 204 may generate a multi-operation command that includes a WRITE WITH XOR multi-operation command role. Furthermore, that multi-operation command may identify a physical memory source address that is included on the host system 202 (e.g., "PHY. MEMORY (SOURCE)") and that identifies a physical memory location on the host system 202 that includes data that is to-be written to the RAID storage device 206b, a logical memory source and destination address that is included in the RAID storage device 206b (e.g., "LOG. MEMORY (SOURCE/DEST)") and that identifies a logical memory location in the storage subsystem 306 on the RAID storage device 206 that both includes data that is to be used in the XOR operation with the data from the host system 202 and provides the location that the data from the host system 202 should be written to, and a physical memory destination address that is included in the RAID storage device 202b (e.g., "PHY. MEMORY (DESTINATION)" and that identifies a physical memory location in the storage subsystem 306 on the RAID storage device 206b to which the results of the XOR operation will be written. Furthermore, that multi-operation command may include a length (e.g., "#LBA") that identifies how many blocks/Logical Block Addresses (LBAs) of data are being transferred as part of the multi-operation command, and may include an optional count parameter value (e.g., "COUNT (OPTIONAL)") that may be used to indicate a number of times the multi-operation command should be repeated, discussed in further detail below.

In another specific example of block 402, the RAID storage controller device 204 may receive an instruction from the host system 202 that requires the writing of data from the host system 202 to the RAID storage device 206b, along with a Galois Field (GF) operation using the data from the host system 202 and data on the RAID storage device 206b and, in response, may determine that a multi-operation command with a "GENERATE 0" multi-operation command role is required based on that instruction. As such, with reference to the multi-operation command table 500, the RAID storage controller device 204 may generate a multi-operation command that includes a GENERATE Q multi-operation command role. Furthermore, that multi-operation command may identify a physical memory source address that is included in the host system 202 (e.g., "PHY. MEMORY (SOURCE)") and that identifies a physical memory location on the host system 202, a physical memory source address that is included in the RAID storage device 206b (e.g., "PHY. MEMORY (SOURCE)") and that identifies a physical memory location in the storage subsystem 306 of the RAID storage device 206b, and a logical memory destination address that is included in the RAID storage device 202b (e.g., "LOG. MEMORY (DESTINATION)" and that identifies a logical memory location in the storage subsystem 306 on the RAID storage device 206b to which the results of the GF operation will be written. Furthermore, that multi-operation command may include a length (e.g., "#LBA") that identifies how many blocks/Logical Block Addresses (LBAs) of data are being transferred as part of the multi-operation command, and may include a multiplicand and position parameter value from the gfLog and gfiLog tables to calculate Galios Field syndromes, discussed in further detail below.

In another specific example of block 402, the RAID storage controller device 204 may receive an instruction from the host system 202 that requires an operation to be performed on data from any addresses (e.g., an address on the host system 202 and an address on the RAID storage device 206b in the example below), and that provides for the writing of the results of that operation to any address (e.g., on the RAID storage device 206b in the examples below) and, in response, may determine that a multi-operation command with a "DATA MANIPULATION" multi-operation command role is required based on that instruction. As such, with reference to the multi-operation command table 500, the RAID storage controller device 204 may generate a multi-operation command that includes a DATA MANIPULATION multi-operation command role. Furthermore, that multi-operation command may identify a physical memory source address that is included in the host system 202 (e.g., "PHY. MEMORY (SOURCE)") and that identifies a physical memory location on the host system 202 that includes data to-be operated on, a physical memory source address that is included in the RAID storage device 206b (e.g., "PHY. MEMORY (SOURCE)") and that identifies a physical memory location in the storage subsystem 306 on the RAID storage device 206 that includes data to-be operated on, and a physical memory destination address that is included in the RAID storage device 202b (e.g., "PHY. MEMORY (DESTINATION)" and that identifies a physical memory location in the storage subsystem 306 on the RAID storage device 206b to which the results of the operation will be written. Furthermore, that multi-operation command may include a length (e.g., "#LBA") that identifies how many blocks/Logical Block Addresses (LBAs) of data are being transferred as part of the multi-operation command, and may include an operator parameter value that includes the operator to be applied to the data being operated on, discussed in further detail below. However, while the address detailed in the example above are described in a particular order, one of skill in the art in possession of the present disclosure will recognize that those addresses may be provided in different orders while remaining within the scope of the present disclosure as well. For example, the physical memory destination address described above that is included in the RAID storage device 202b (e.g., "PHY. MEMORY (DESTINATION)" and that identifies a physical memory location in the storage subsystem 306 on the RAID storage device 206b to which the results of the operation will be written may instead be included on the host system 202 (or other storage systems) while remaining within the scope of the present disclosure as well.

Figure 6:
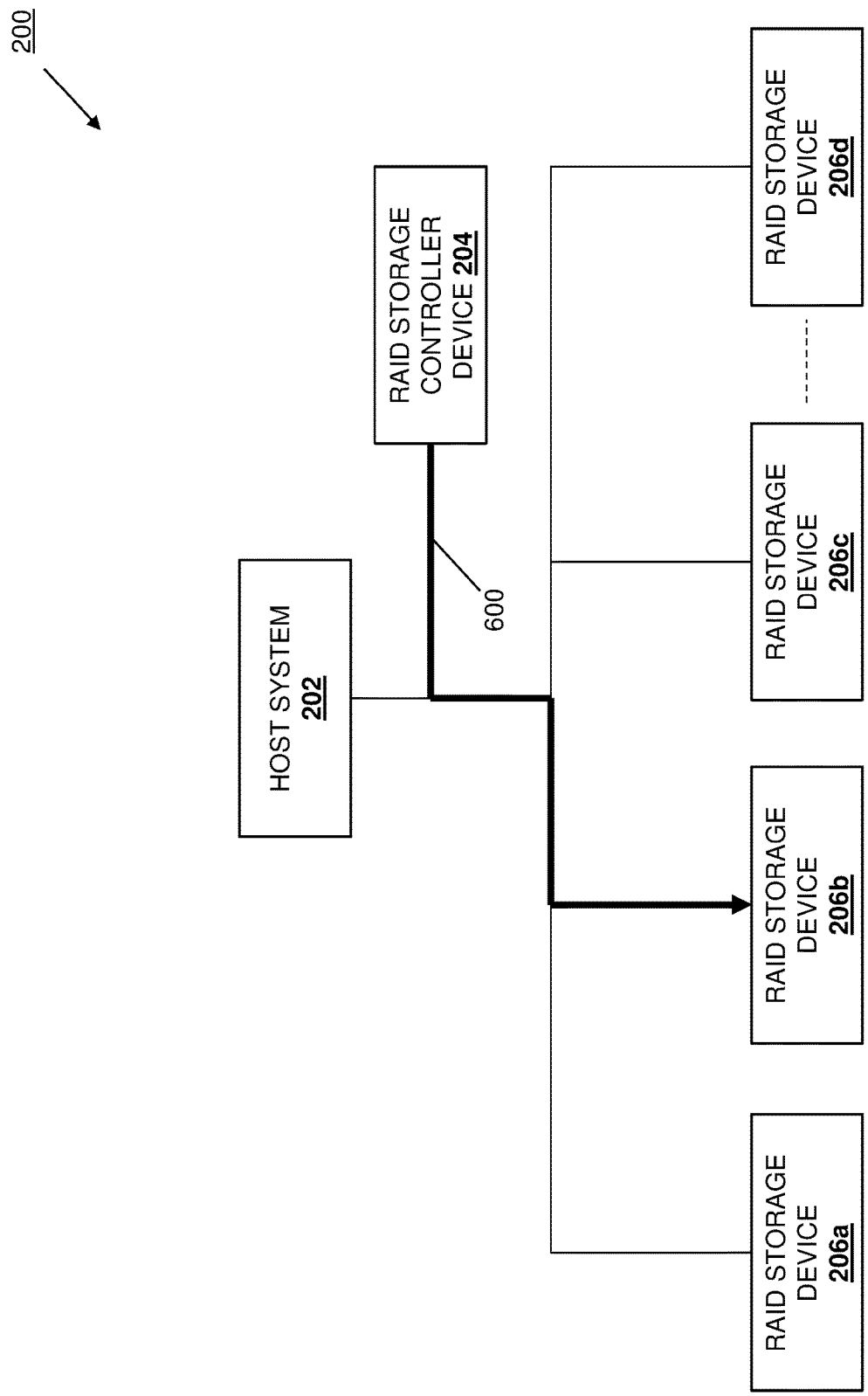
FIG. 6 is a schematic view illustrating an embodiment of the RAID storage system operating during the method of FIG. 4.

With reference to FIG. 6, the RAID storage controller device 204 is illustrated transmitting a multi-operation command 600 to the RAID storage controller device 206b, which may be the multi-operation commands discussed above with the WRITE WITH BUFFER multi-operation command role, the WRITE WITH XOR multi-operation command role, the GENERATE Q multi-operation command role, or the DATA MANIPULATION multi-operation command role discussed above, as well as any of the multi-operation command roles that would be apparent to one of skill in the art in possession of the present disclosure. As such, while several specific multi-operation command roles are discussed herein in detail, one of skill in the art in possession of the present disclosure will recognize that the RAID storage controller device 204 may generate and transmit any of a variety of multi-operation commands while remaining within the scope of the present disclosure as well.

The method 400 then proceeds to block 404 where a RAID storage device receives the multi-operation command and identifies a plurality of operations associated with a multi-operation command role included in the multi-operation command. In an embodiment, during or prior to the method 400, the RAID storage devices 206a-206d may be provided with operational steps associated with each multi-operation command role that may be received during the method 400. For example, the RAID storage database 309 in each of the RAID storage devices 206a-206d/300 may be provided with operational steps for each multi-operation command role in the multi-operation command table 500. As such, the RAID storage database 309 in each of the RAID storage devices 206a-206d/300 may include the WRITE WITH BUFFER multi-operation command role associated with operational steps that include a first operational step that retrieves data from the first address (e.g., ADDR. 1) associated with the WRITE WITH BUFFER multi-operation command role, a second operational step that writes that data from the first address (e.g., ADDR. 1) to the second address (e.g., ADDR. 2) associated with the WRITE WITH BUFFER multi-operation command role (e.g., "ADDR. 1>ADDR. 2"), and a third operational step that writes the data from the first address (e.g., ADDR. 1) to the third address (e.g., ADDR. 3) associated with the WRITE WITH BUFFER multi-operation command role (e.g., "ADDR. 1>ADDR. 3").

Furthermore, the RAID storage database 309 in each of the RAID storage devices 206a-206d/300 may include the WRITE WITH XOR multi-operation command role associated with operational steps that include a first operational step that retrieves data from the first address (e.g., ADDR. 1) associated with the WRITE WITH XOR multi-operation command role, a second operational step that performs an XOR operation on the data from the first address (e.g., ADDR. 1) and data in the second address (e.g., ADDR. 2) associated with the WRITE WITH XOR multi-operation command role, a third operational step that writes the result of XOR operation to the third address (e.g., ADDR. 3) associated with the WRITE WITH XOR multi-operation command role (e.g., "XOR (ADDR. 1, ADDR. 2)>ADDR. 3"), and a fourth operational step that writes the data from the first address (e.g., ADDR. 1) to the second address (e.g., ADDR. 2) (e.g., "ADDR. 1>ADDR. 2"). In addition, the RAID storage database 309 in each of the RAID storage devices 206a-206d/300 may include instructions to repeat the XOR operation discussed above a number of times that is defined by the optional count parameter (e.g., using the length (e.g., #LBA) as the stride).

As will be appreciated by one of skill in the art in possession of the present disclosure, the specific WRITE WITH XOR multi-operation command role described above may have variants. For example, the WRITE WITH XOR multi-operation command role may have the RAID storage device perform each of its operational steps described above with the exception of writing the data from the first address (e.g., ADDR. 1) associated with the WRITE WITH XOR multi-operation command role to the third address (e.g., ADDR. 3) associated with the WRITE WITH XOR multi-operation command role (e.g., "XOR (ADDR. 1>ADDR. 3") in place of the third operational step that writes the result of XOR operation to the third address (e.g., ADDR. 3) associated with the WRITE WITH XOR multi-operation command role (e.g., "XOR (ADDR. 1, ADDR. 2)>ADDR. 3"). For example, such a variant may be utilized with primary data storage devices provided in RAID 5 or RAID 6 configurations.

Further still, the RAID storage database 309 in each of the RAID storage devices 206a-206d/300 may include the GENERATE Q multi-operation command role associated with operational steps that include a first operational step that retrieves data from the first address (e.g., ADDR. 1) associated with the GENERATE Q multi-operation command role, a second operational step that uses the parameter value (e.g., "MULTIPLICAND & POSITION") to perform a GF operation on the data from the first address (e.g., ADDR. 1) and data in the second address (e.g., ADDR. 2) associated with the GENERATE Q multi-operation command role, and a third operational step that writes the result of GF operation to the third address (e.g., ADDR. 3) associated with the GENERATE Q multi-operation command role (e.g., "GF (ADDR. 1, ADDR. 2)>ADDR. 3").

Further still, the RAID storage database 309 in each of the RAID storage devices 206a-206d/300 may include the DATA MANIPULATION multi-operation command role associated with operational steps that include a first operational step that retrieves data from the first address (e.g., ADDR. 1) associated with the DATA MANIPULATION multi-operation command role, a second operational step that uses the parameter value (e.g., "OPERATOR") to perform an operation on the data from the first address (e.g., ADDR. 1) and data in the second address (e.g., ADDR. 2) associated with the DATA MANIPULATION multi-operation command role, and a third operational step that writes the result of operation to the third address (e.g., ADDR. 3) associated with the DATA MANIPULATION multi-operation command role (e.g., "ADDR. 1 (OPERATOR) ADDR. 2)>ADDR. 3").

Thus, in an embodiment and at block 404, the RAID storage engine 304 in the RAID storage device 206b may receive the multi-operation command 600 from the RAID storage controller device 204 via its communication system 310 and, in response, may determine the multi-operation command role included in the multi-operation command 600, and identify the operational steps that are associated with that multi-operation command 600 in its RAID storage database 309 (detailed above.) As such, if the multi-operation command 600 includes the WRITE WITH BUFFER multi-operation command role, the RAID storage engine 304 may identify the first operational step to retrieve data from the first address associated with the WRITE WITH BUFFER multi-operation command role, the second operational step that writes that data from the first address to the second address associated with the WRITE WITH BUFFER multi-operation command role, and the third operational step that writes the data from the first address to the third address associated with the WRITE WITH BUFFER multi-operation command role.

Similarly, if the multi-operation command 600 includes the WRITE WITH XOR multi-operation command role, the RAID storage engine 304 may identify the first operational step that retrieves data from the first address associated with the WRITE WITH XOR multi-operation command role, the second operational step that performs an XOR operation on the data from the first address and data in the second address associated with the WRITE WITH XOR multi-operation command role, the third operational step that writes the result of XOR operation to the third address associated with the WRITE WITH XOR multi-operation command role, and the fourth operational step that writes the data from the first address to the second address.

Similarly, if the multi-operation command 600 includes the GENERATE Q multi-operation command role, the RAID storage engine storage engine 304 may identify the first operational step that retrieves data from the first address associated with the GENERATE Q multi-operation command role, the second operational step that uses the parameter value to perform a GF operation on the data from the first address and data in the second address associated with the GENERATE Q multi-operation command role, and the third operational step that writes the result of GF operation to the third address associated with the GENERATE Q multi-operation command role. Similarly, if the multi-operation command 600 includes the DATA MANIPULATION multi-operation command role, the RAID storage engine storage engine 304 may identify the first operational step that retrieves data from the first address associated with the DATA MANIPULATION multi-operation command role, the second operational step that uses the parameter value to perform an operation on the data from the first address and data in the second address associated with the DATA MANIPULATION multi-operation command role, and the third operational step that writes the result of the operation to the third address associated with the DATA MANIPULATION multi-operation command role.

The method 400 then proceeds to optional block 406 where the RAID storage device may identify an operation parameter included in the multi-operation command. As discussed above, some multi-operation command roles may include an operation parameter that may be utilized in operation(s) that are part of the multi-operation command and, as such, in some embodiments the RAID storage engine 304 in the RAID storage device 206b may identify an operational parameter in the multi-operation command 600. For example, at block 406, the RAID storage engine 304 in the RAID storage device 206b may identify the "COUNT" operational parameter in the multi-operation command 600 that includes the WRITE WITH XOR multi-operation command role. Similarly, at block 406, the RAID storage engine 304 in the RAID storage device 206b may identify the "MULTIPLICAND & POSITION" operational parameter in the multi-operation command 600 that includes the GENERATE Q multi-operation command role. Similarly, at block 406, the RAID storage engine 304 in the RAID storage device 206b may identify the "OPERATOR" operational parameter in the multi-operation command 600 that includes the DATA MANIPULATION multi-operation command role.

The method 400 then proceeds to block 408 where the RAID storage device performs the plurality of operations using a plurality of addresses included in the multi-operation command. In an embodiment, at block 408, the RAID storage engine 304 in the RAID storage device 206b may operate to perform the multiple operational steps associated with the multi-operation command role that was identified in the multi-operation command 600 using the addresses that were included in that multi-operation command. For example, with reference to the multi-operation command 600 that identified the WRITE WITH BUFFER multi-operation command role discussed above, at block 408 the RAID storage engine 304 in the RAID storage device 206b may perform the multiple operational steps identified at block 404 using the plurality of addresses included in the multi-operation command 600. As such, the RAID storage engine 304 in the RAID storage device 206b may perform the first operational step identified at block 404 to retrieve data from the first physical source address (e.g., ADDR. 1/PHY. MEMORY (SOURCE)) in the host system 202, then may perform the second operational step identified at block 404 to write the data retrieved from that first physical source address to the second logical destination address (e.g., ADDR. 2/LOG. MEMORY (DESTINATION)) in the storage subsystem 306 of the RAID storage device 206b (e.g., "ADDR. 1>ADDR. 2"), and then may perform the third operational step identified at block 404 to write the data retrieved from the first physical source address to the third physical destination address (e.g., ADDR. 3) in the buffer subsystem 308 of the RAID storage device 206b (e.g., "ADDR. 1>ADDR. 3"). As will be appreciated by one of skill in the art in possession of the present disclosure, the retrieval of the data from the first physical source address in the host system 202 and the writing of that data to the second logical destination address and the third physical destination address in the RAID storage device 206b may be performed using Direct Memory Access (DMA) operations performed by the RAID storage engine 304.

Similarly, with reference to the multi-operation command 600 that identified the WRITE WITH XOR multi-operation command role discussed above, at block 408 the RAID storage engine 304 in the RAID storage device 206b may perform the multiple operational steps identified at block 404 using the plurality of addresses included in the multi-operation command 600. As such, the RAID storage engine 304 in the RAID storage device 206b may perform the first operational step identified at block 404 to retrieve data from the first physical source address (e.g., ADDR. 1/PHY. MEMORY (SOURCE)) in the host system 202, then may perform the second operational step that includes an XOR operation on the data retrieved from that first physical source address and data in the second logical source address (e.g., ADDR. 2/LOG. MEMORY (SOURCE)) in the storage subsystem 306 of the RAID storage device 206b, then perform the third operational step to write the result of XOR operation to the third physical destination address (e.g., ADDR. 3/PHY. MEMORY (DESTINATION)) in the storage subsystem 206 of the RAID storage device 206b (e.g., "XOR (ADDR. 1, ADDR. 2)>ADDR. 3"), and then perform the fourth operational step to write the data from the first physical source address (e.g., ADDR. 1/PHY. MEMORY (SOURCE)) to the second logical destination address (e.g., ADDR. 2/LOG. MEMORY (SOURCE)) (e.g., "ADDR. 1>ADDR. 2"). In addition, as discussed above, the RAID storage engine 304 may access the RAID storage database 309 to determine whether instructions to repeat the XOR operation discussed above a number of times are defined by the optional count parameter (e.g., using the length (e.g., #LBA) as the stride). However, as discussed above, variants of the WRITE WITH XOR multi-operation command role may replace the third operational step (e.g., "XOR (ADDR. 1, ADDR. 2)>ADDR. 3" with "ADDR. 1>ADDR. 3") while remaining within the scope of the present disclosure as well. As will be appreciated by one of skill in the art in possession of the present disclosure, the retrieval of the data from the first physical source address in the host system 202 and the writing of that data to the second logical destination address in the RAID storage device 206b may be performed using Direct Memory Access (DMA) operations performed by the RAID storage engine 304.

Similarly, with reference to the multi-operation command 600 that identified the GENERATE Q multi-operation command role discussed above, at block 408 the RAID storage engine 304 in the RAID storage device 206b may perform the multiple operational steps identified at block 404 using the plurality of addresses included in the multi-operation command 600. As such, the RAID storage engine 304 in the RAID storage device 206b may perform the first operational step to retrieve data from the first physical source address (e.g., ADDR. 1/PHY. MEMORY (SOURCE)) in the host system 202, the perform the second operational step that uses the parameter value (e.g., "MULTIPLICAND & POSITION") to perform a GF operation on the data from that first physical source address and data in the second physical source address (e.g., ADDR. 2/PHY. MEMORY (SOURCE)) in the storage subsystem 306 in the RAID storage device 206b, and then perform the third operational step to write the result of GF operation to the third logical destination address (e.g., ADDR. 3/LOG. MEMORY (DESTINATION) in the storage subsystem 306 of the RAID storage subsystem 206b (e.g., "GF (ADDR. 1, ADDR. 2)>ADDR. 3"). As will be appreciated by one of skill in the art in possession of the present disclosure, the retrieval of the data from the first physical source address in the host system 202 may be performed using Direct Memory Access (DMA) operations performed by the RAID storage engine 304.

Similarly, with reference to the multi-operation command 600 that identified the DATA MANIPULATION multi-operation command role discussed above, at block 408 the RAID storage engine 304 in the RAID storage device 206b may perform the multiple operational steps identified at block 404 using the plurality of addresses included in the multi-operation command 600. As such, the RAID storage engine 304 in the RAID storage device 206b may perform the first operational step to retrieve data from the first physical source address (e.g., ADDR. 1/PHY. MEMORY (SOURCE)) in the host system 202, then perform the second operational step that uses the parameter value (e.g., "OPERATOR") to perform an operation on the data from that first physical source address and data in the second physical source address (e.g., ADDR. 2/PHY. MEMORY (SOURCE)) in the storage subsystem 306 of the RAID storage subsystem 206b, and then perform the third operational step to write the result of operation to the third physical destination address (e.g., ADDR. 3/PHY. MEMORY (DESTINATION)) in the storage subsystem 306 of the RAID storage device 206b (e.g., "ADDR. 1 (OPERATOR) ADDR. 2)>ADDR. 3"). As will be appreciated by one of skill in the art in possession of the present disclosure, the retrieval of the data from the first physical source address in the host system 202 may be performed using Direct Memory Access (DMA) operations performed by the RAID storage engine 304.

As such, multi-operation commands are enabled that may be generated and transmitted as a single command from the RAID storage controller device 204 to any RAID storage device, and that provides for the performance of multiple operations by the RAID storage engine 304 in that RAID storage device. As such, the number of commands generated and transmitted by the RAID storage controller device may be reduced. FIGS. 7A, 7B, and 7C illustrate multi-operation command tables 700A, 700B, and 700C that include a variety of examples of other multi-operation commands that may be implemented in the RAID storage system 200 in a manner similar to that described above. For example, the multi-operation command table 700A includes a write command role; a RAID 1 write command role that provides an example of step one of a RAID 1 write with no strict ordering of steps; a RAID 5 parity write command role that provides a full stripe write parity final step and a rebuild step; a RAID 5 parity partial write 1 & 2 command role that provides partial stripe write parity final steps; a RAID 5 compute command role that provides partial stripe write and full stripe write interim parity calculations, a rebuild interim parity calculation, and a missing memory read interim and final calculation; a RAID 5 recovery interim command role; and a RAID 5 data partial write command role.

Similarly, the multi-operation command table 700B includes a RAID 6 update command role; RAID 6 compute 1 and 2 command roles; RAID 6 recovery 1 and 2 command roles; and a RAID 6 tables generation command role that provides for the generation of n-length gflog and gfilog tables (which may be stored internally in the RAID storage device.) Similarly, the multi-operation command table 700C includes a read command role; copy command role that may provide for the generation of data transfers for interim parity calculations; an acquire lock command role that provides for the acquiring of a lock on a LBA range for writes, and that lock may be held until the lock is released or the device is reset (fundamental, secondary, etc.), i.e., if there are any writes pending to the identified memory region, the RAID storage engine will wait till they are complete and then acquire the lock and return status; a release lock command role that provides for the release of a lock region; and an acquire lock and read command role that provides for reads only after the successful locking of a lock region. One of skill in the art in possession of the present disclosure will recognize how the multi-operation commands in the multi-operation command tables 700A, 700B, and 700C may be implemented in a manner similar to those in the multi-operation command table 500 discussed above, and that any of a variety of multi-operation commands may be defined in a similar manner while remaining within the scope of the present disclosure as well.

Thus, systems and methods have been described that provide for the generation and transmission of multi-operation commands by a RAID storage controller device to a RAID storage device, with the RAID storage device that receives that multi-operation command performing multiple operations using a plurality of addresses identified in the multi-operation command. For example, the multi-operation command may identify a multi-operation command role and the plurality of addresses, and the RAID storage device receiving that multi-operation command may identify a plurality of operations associated the multi-operation command role in a database. The RAID storage device may then perform the plurality of operations using the plurality of addresses and, in some embodiments, may include the use of an operational parameter included in the multi-operation command. As such, RAID storage controller devices may send a single command that is configured to cause a RAID storage device to perform multiple operations, rather than sending a respective command for each of those operations, thus increasing the ability of the RAID storage controller device to scale with high performance RAID storage devices Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Redundant Array of Independent Disk (RAID) storage multi-operation command system, comprising:
   a Redundant Array of Independent Disk (RAID) storage controller device that is configured to:
      generate a multi-operation command that includes:
         a multi-operation command role that is associated with a plurality of operations that include at least a first operation and a second operation that is a different type of operation than the first operation; and
         a plurality of addresses; and
      transmit the multi-operation command in a single command transmission; and
   a RAID storage device that is coupled to the RAID storage controller device and that is configured to:
      receive, from the RAID storage controller device in the single command transmission, the multi-operation command;
      identify, in a database, the plurality of operations that are associated with the multi-operation command role included in the multi-operation command; and
      perform the plurality of operations using the plurality of addresses included in the multi-operation command.

2. The system of claim 1, wherein the multi-operation command includes:
   an operation parameter, and wherein the RAID storage device is configured to perform the plurality of operations using the operation parameter and the plurality of addresses included in the multi-operation command.

3. The system of claim 2, wherein the performing the plurality of operations using the plurality of addresses included in the multi-operation command includes
   retrieving first data located in a first address in the plurality of addresses included in the multi-operation command;
   retrieving second data located in a second address in the plurality of addresses included in the multi-operation command;
   applying the operation parameter to the first data and the second data to produce third data; and
   writing the third data to at least one third address in the plurality of addresses included in the multi-operation command.

4. The system of claim 1, wherein the performing the plurality of operations using the plurality of addresses included in the multi-operation command includes:
   retrieving data located in a first address in the plurality of addresses included in the multi-operation command; and
   writing the data to at least one second address in the plurality of addresses included in the multi-operation command.

5. The system of claim 1, wherein the performing the plurality of operations using the plurality of addresses included in the multi-operation command includes:
   retrieving first data located in a first address in the plurality of addresses included in the multi-operation command;
   retrieving second data located in a second address in the plurality of addresses included in the multi-operation command;
   performing an XOR operation on the first data and the second data to produce third data; and
   writing the third data to at least one third address in the plurality of addresses included in the multi-operation command.

6. The system of claim 1, wherein the performing the plurality of operations using the plurality of addresses included in the multi-operation command includes:
   retrieving first data located in a first address in the plurality of addresses included in the multi-operation command;
   retrieving second data located in a second address in the plurality of addresses included in the multi-operation command;
   retrieving an operation parameter;
   performing a Galois Field operation on the first data, the second data, and the operation parameter to produce third data; and
   writing the third data to at least one third address in the plurality of addresses included in the multi-operation command.

7. An Information Handling System (IHS), comprising:
   a processing system; and
   a memory system that is coupled to the processing system and that includes instructions that, when executed by the processing system, cause the processing system to provide a RAID storage engine that is configured to:
      receive, from a RAID storage controller device in a single command transmission, a multi-operation command that includes:
         a multi-operation command role that is associated with a plurality of operations that include at least a first operation and a second operation that is different type of operation than the first operation; and
         a plurality of addresses;
      identify, in a database, the plurality of operations that are associated with the multi-operation command role included in the multi-operation command; and
      perform the plurality of operations using the plurality of addresses included in the multi-operation command.

8. The IHS of claim 7, wherein the multi-operation command includes:
   an operation parameter, and wherein the RAID storage engine is configured to perform the plurality of operations using the operation parameter and the plurality of addresses included in the multi-operation command.

9. The IHS of claim 8, wherein the performing the plurality of operations using the plurality of addresses included in the multi-operation command includes:
   retrieving first data located in a first address in the plurality of addresses included in the multi-operation command;

retrieving second data located in a second address in the plurality of addresses included in the multi-operation command;

applying the operation parameter to the first data and the second data to produce third data; and writing the third data to at least one third address in the plurality of addresses included in the multi-operation command.

10. The IHS of claim 7, wherein the performing the plurality of operations using the plurality of addresses included in the multi-operation command includes:

retrieving data located in a first address in the plurality of addresses included in the multi-operation command; and writing the data to at least one second address in the plurality of addresses included in the multi-operation command.

11. The IHS of claim 7, wherein the performing the plurality of operations using the plurality of addresses included in the multi-operation command includes:

retrieving first data located in a first address in the plurality of addresses included in the multi-operation command;

retrieving second data located in a second address in the plurality of addresses included in the multi-operation command;

performing an XOR operation on the first data and the second data to produce third data; and writing the third data to at least one third address in the plurality of addresses included in the multi-operation command.

12. The IHS of claim 7, wherein the performing the plurality of operations using the plurality of addresses included in the multi-operation command includes:

retrieving first data located in a first address in the plurality of addresses included in the multi-operation command;

retrieving second data located in a second address in the plurality of addresses included in the multi-operation command;

retrieving an operation parameter;

performing a Galois Field operation on the first data, the second data, and the operation parameter to produce third data; and writing the third data to at least one third address in the plurality of addresses included in the multi-operation command.

13. The IHS of claim 7, further comprising:

a storage system that is coupled to the processing system, wherein the plurality of addresses include:

a first address that identifies a first storage location on a host system that is separate from the storage system; and a second address that identifies a second storage location on the storage system.

14. A method for executing multi-operation commands by RAID storage devices, comprising:

receiving, by a RAID storage device from a RAID storage controller device in a single command transmission, a multi-operation command that includes:

a multi-operation command role that is associated with a plurality of operations that include at least a first operation and a second operation that is a different type of operation than the first operation; and a plurality of addresses;

identifying, by the RAID storage device in a database, the plurality of operations that are associated with the multi-operation command role included in the multi-operation command; and performing, by the RAID storage device, the plurality of operations using the plurality of addresses included in the multi-operation command.

15. The method of claim 14, wherein the multi-operation command includes an operation parameter, and wherein the method includes:

performing, by the RAID storage device, the plurality of operations using the operation parameter and the plurality of addresses included in the multi-operation command.

16. The method of claim 15, wherein the performing the plurality of operations using the plurality of addresses included in the multi-operation command includes:

retrieving first data located in a first address in the plurality of addresses included in the multi-operation command;

retrieving second data located in a second address in the plurality of addresses included in the multi-operation command;

applying the operation parameter to the first data and the second data to produce third data; and writing the third data to at least one third address in the plurality of addresses included in the multi-operation command.

17. The method of claim 14, wherein the performing the plurality of operations using the plurality of addresses included in the multi-operation command includes:

retrieving data located in a first address in the plurality of addresses included in the multi-operation command; and writing the data to at least one second address in the plurality of addresses included in the multi-operation command.

18. The method of claim 14, wherein the performing the plurality of operations using the plurality of addresses included in the multi-operation command includes:

retrieving first data located in a first address in the plurality of addresses included in the multi-operation command;

retrieving second data located in a second address in the plurality of addresses included in the multi-operation command;

performing an XOR operation on the first data and the second data to produce third data; and writing the third data to at least one third address in the plurality of addresses included in the multi-operation command.

19. The method of claim 14, wherein the performing the plurality of operations using the plurality of addresses included in the multi-operation command includes:

retrieving first data located in a first address in the plurality of addresses included in the multi-operation command;

retrieving second data located in a second address in the plurality of addresses included in the multi-operation command;

retrieving an operation parameter;

performing a Galois Field operation on the first data, the second data, and the operation parameter to produce third data; and writing the third data to at least one third address in the plurality of addresses included in the multi-operation command.

20. The method of claim 14, wherein the plurality of addresses include:
a first address that identifies a first storage location on a host system that is separate from the RAID storage device; and
a second address that identifies a second storage location on a storage system that is included in the RAID storage device.

* * * * *